(Model.)
C. C. P. McCORD.
Safety Pulley.
No. 231,828.          Patented Aug. 31, 1880.
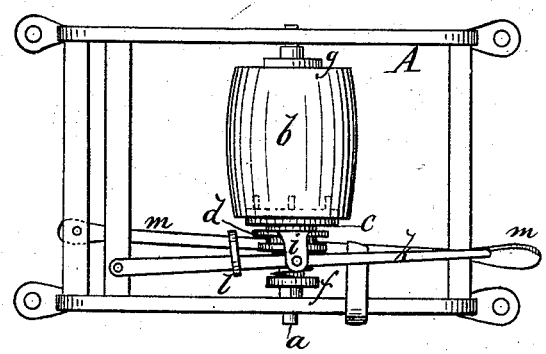
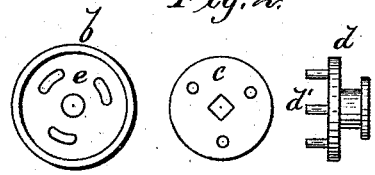
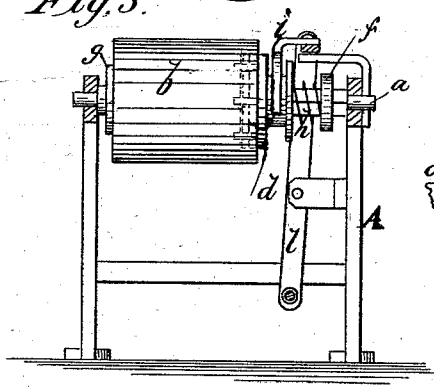
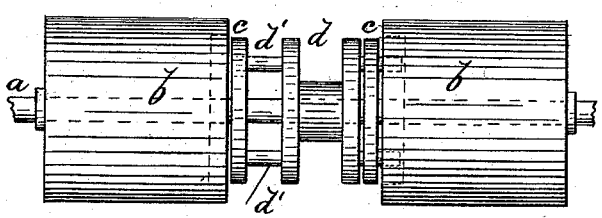
WITNESSES:
Henry N. Miller
C. Sedgwick
INVENTOR:
C. C. P. McCord
BY Munn & Co
ATTORNEYS.

UNITED STATES PATENT OFFICE.

CHRISTOPHER C. P. McCORD, OF WALNUT GROVE, ARKANSAS.

SAFETY-PULLEY.

SPECIFICATION forming part of Letters Patent No. 231,828, dated August 31, 1880.

Application filed June 30, 1880. (Model.)

*To all whom it may concern:*

Be it known that I, CHRISTOPHER C. P. McCORD, of Walnut Grove, in the county of Independence and State of Arkansas, have invented a new and Improved Safety-Pulley, of which the following is a specification.

My improvements relate to driving-pulleys for cotton-gins and other machines, and have for their object to furnish devices by which the power may be quickly disconnected from the machine in case of accident.

The construction shown, by which the pulley is connected and disconnected by clutch mechanism, is especially adapted for cotton-gins in which fast and loose pulleys are not practicable, on account of the width of belt and the limited space.

In the accompanying drawings, Figure 1 is a plan view, showing my invention as applied to a cotton-gin frame. Fig. 2 shows details of the mechanism. Fig. 3 is an end view, partially in section. Fig. 4 represents a modification.

Similar letters of reference indicate corresponding parts.

A is a frame, which may represent the frame of a cotton-gin, and $a$ a mandrel on frame A, carrying the driving-pulley $b$.

$c$ is a collar fixed upon the mandrel $a$, and formed with three holes, equidistant from each other, as shown in Fig. 2.

$d$ is a flanged collar loose on mandrel $a$, and provided with three projecting pins, $d'$. (Shown most clearly in Fig. 2.)

$e$ is a disk or collar secured to the end of pulley $b$, and formed with three slots, as shown in Fig. 2. This collar $e$ may be upon the end of thimble, which is loose on the mandrel, and upon which the pulley is secured, so that the thimble serves as a box for the pulley.

$f$ is a collar on mandrel $a$. $g$ is a similar collar on mandrel $a$, at the opposite end of the pulley, and $h$ is a spiral spring between the fixed collar $f$ and loose collar $d$, tending to move the collar $d$ toward the pulley $b$.

The collar $d$ is formed with an annular groove for receiving the forked ends of an arm, $i$, that is hung from the hand-lever $k$, which is pivoted on the frame A. The lever K is also connected with a lever, $l$, that is pivoted on frame A, and connects with a foot-lever, $m$.

The collar $d$ being forced to the pulley by spring $h$, its pins $d'$ extend through the apertures of collars $c$ $e$, and thus connect the pulley $b$ with the mandrel. By movement of the hand-lever $k$ or foot-lever $m$ the collar $d$ is carried outward and the pins $d'$ released from the collar $e$ on the pulley, so that the pulley may revolve free on the mandrel. A suitable latch will be provided for holding the lever $k$ when moved to disconnect the pulley.

As shown, the end of the pulley is recessed to receive the collars $c$ $d$ $e$; but they may be outside the pulley if desired. The levers may be arranged in any desired manner instead of as shown.

In Fig. 4 my invention is shown as applied in connection with two pulleys, $b$, on one shaft. The spring is dispensed with and the collar $d$ provided with pins at opposite sides, so that it may be connected with either pulley. This construction is adapted for reversing the motion of a machine, the belt to one pulley $b$ being crossed for that purpose.

This safety-pulley, when applied to gins and other machines, enables the operator to throw off the power immediately. It is especially useful for gins, as accidents by catching of hands and clothing in the saws are of frequent occurrence.

With an iron pulley the slotted disk $e$ may be omitted and the slots made in the end of the pulley.

Having thus fully described my invention, I claim as new and desire to secure by Letters Patent—

The combination, with the mandrel $a$, carrying the drive-pulley $b$, in the cotton-gin frame A, of the collar $c$, fixed on the mandrel and having three equally-distant holes, the loose flanged collar $d$, having three projecting side pins, $d'$, the pulley-collar $e$, having three slots, the mandrel-collars $f$ $g$, and the spiral spring $h$, the whole adapted to be operated by hand or foot mechanism, substantially as described.

CHRISTOPHER COLUMBUS PORTER McCORD.

Witnesses:
J. L. HENSLEY,
JOSEPH E. GREER.